Sept. 11, 1962    O. G. DOUGLAS    3,053,053
FLUID POWER SYNCHRONIZING DEVICE
Filed June 27, 1960    5 Sheets-Sheet 1

INVENTOR.
OLLIE G. DOUGLAS
BY William R. Price
ATTORNEY

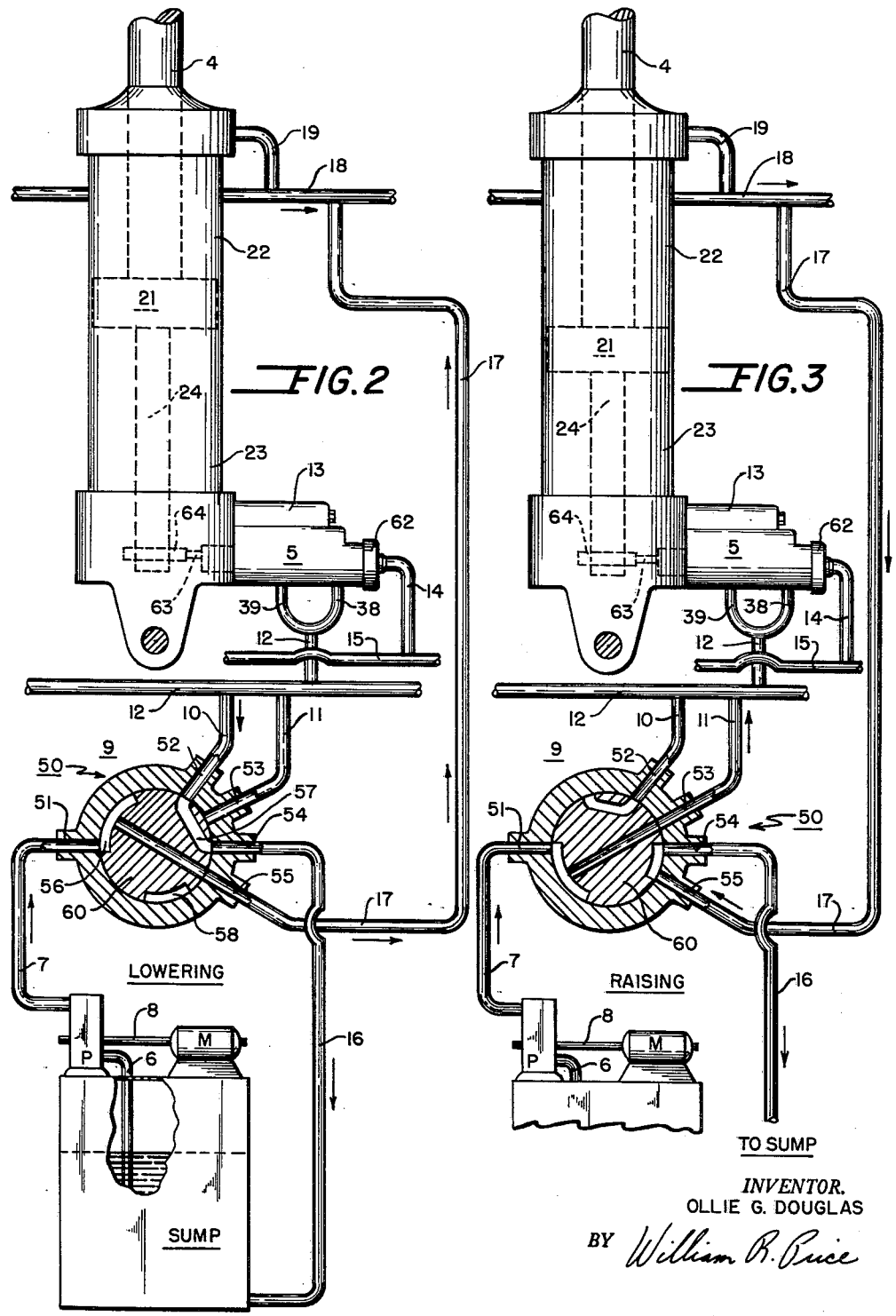

INVENTOR.
OLLIE G. DOUGLAS
BY William R. Price
ATTORNEY

Sept. 11, 1962   O. G. DOUGLAS   3,053,053
FLUID POWER SYNCHRONIZING DEVICE
Filed June 27, 1960   5 Sheets-Sheet 4
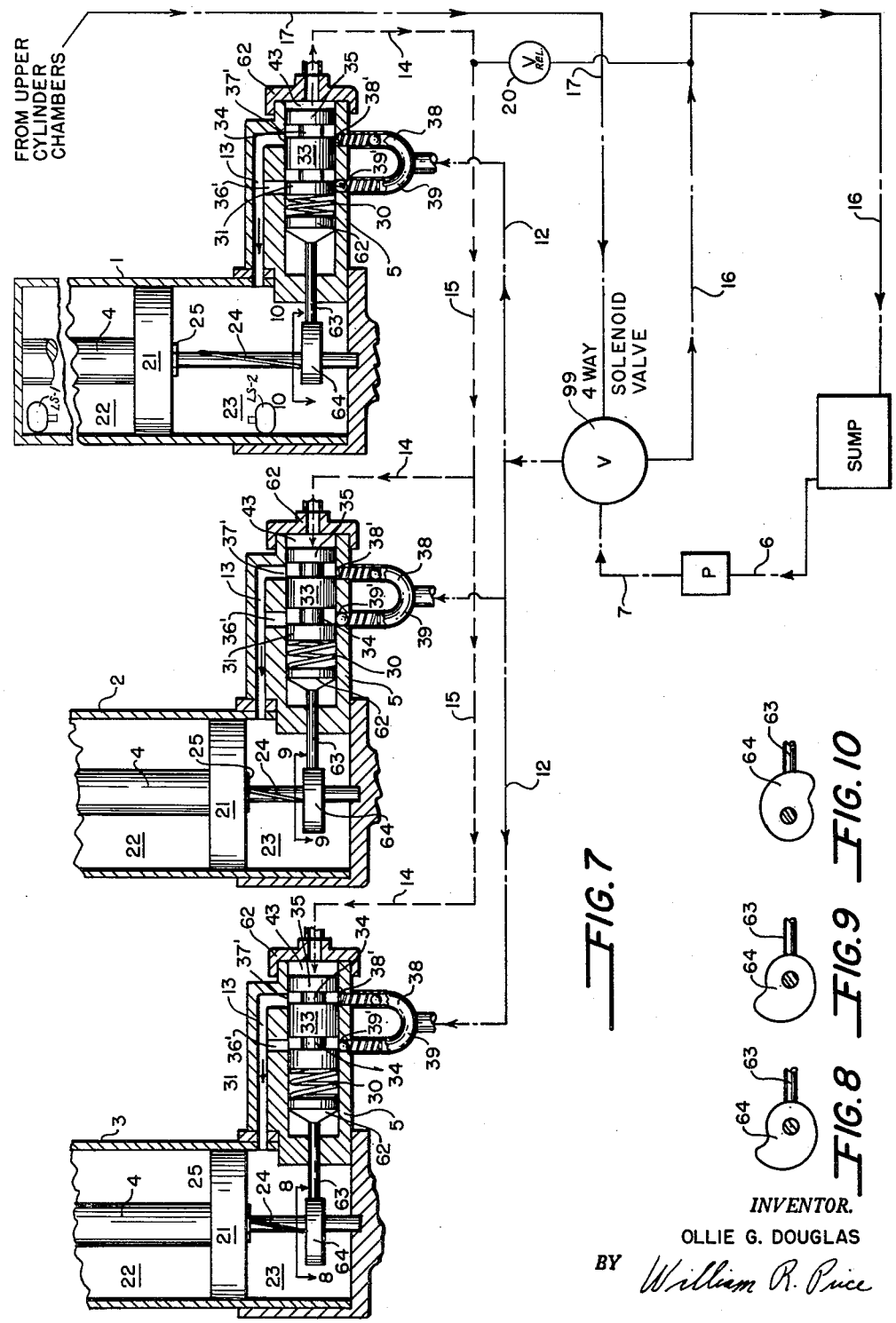
INVENTOR.
OLLIE G. DOUGLAS
BY William R. Price
ATTORNEY Sept. 11, 1962 O. G. DOUGLAS 3,053,053
FLUID POWER SYNCHRONIZING DEVICE
Filed June 27, 1960 5 Sheets-Sheet 5
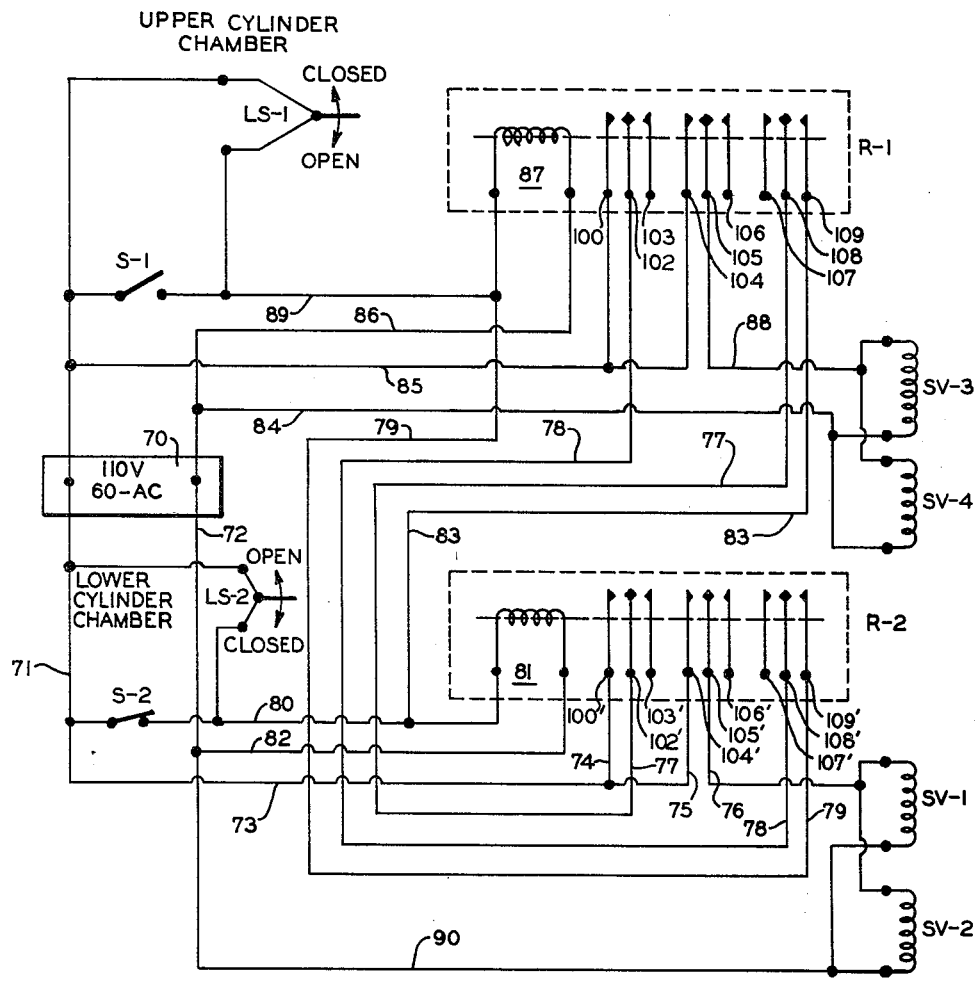
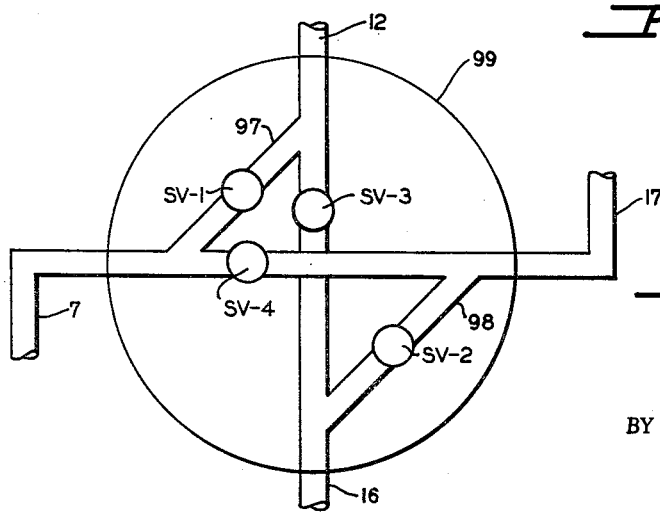
INVENTOR.
OLLIE G. DOUGLAS
BY *Wm. R. Price*
ATTORNEY

United States Patent Office 3,053,053
Patented Sept. 11, 1962

3,053,053
FLUID POWER SYNCHRONIZING DEVICE
Ollie G. Douglas, R.R. 1, Elizabethtown, Ky.
Filed June 27, 1960, Ser. No. 39,046
8 Claims. (Cl. 60—97)

This invention relates to a system for the control of the movement of a plurality of fluid actuated motors to equalize their movement. More particularly, this invention relates to fluid power devices, having synchronizing means of the kind comprising two or more hydraulic power elements, such as fluid motor elements which are intended to be operated in synchronism. More particularly, this invention relates to control valve systems for regulating a supply of fluid delivered to a plurality of hydraulic motors, such as for example, hydraulic rams or jacks such as are used with a large loading platform, to cause equal and synchronous movement of the jacks, even if said platform is unequally loaded.

In systems wherein a plurality of fluid or hydraulic motors operate a number of separate devices, it is frequently desirable that the devices move in synchronism or substantially simultaneously. Where the motors are loaded to an equal extent, it is usually possible to provide suitable actuating motors and a fluid system which will cause the device to be moved simultaneously. However, where the individual load differs to any extent, the most heavily loaded device usually lags behind those which are more lightly loaded. An example of this may be found in control flaps which in large aircraft are operated by double acting hydraulic cylinders fed with pressure fluid from a single source. Differences in frictional loads and other loads will often cause one of the flaps to travel at a rate of movement different from the rate of the other, producing a dangerous condition which can be avoided only by synchronizing the movement of the control flaps.

It is, therefore, an object of this invention to provide a mechanism to obtain synchronism of movement of a plurality of fluid driven motors.

Another object of this invention is to provide a novel control means for simultaneously operating a plurality of fluid operated pistons for maintaining substantially synchronized movement of the piston elements.

Another object of the invention is to provide in or for a hydraulic power device of the above kind, means for automatically sensing and correcting any lack of synchronization which may arise in the operation of the device.

Still another object of this invention is to provide means for automatically sensing and correcting any lack of synchronism between the various piston elements, said means being self contained.

Other objects and advantages of this invention will be apparent from the following description taken in connection with the accompanying drawings in which:

FIG. 2 is a schematic illustration of the operation of one of the cylinders in a series in which the piston rod of the cylinder is being lowered.

FIG. 3 is a schematic illustration of one of a series of cylinders in which the piston rod of the cylinder is being raised.

FIG. 7 is a partially schematic diagram of the system of this invention illustrating the operation of synchronizing valves when one piston element gets out of synchronism.

FIG. 8 is a fragmentary plan view taken along lines 8—8 of FIG. 7 which illustrates the position of the cam in relation to the position of the piston element.

FIG. 9 is a fragmentary plan view taken along lines 9—9 of FIG. 7 and

FIG. 10 is a fragmentary plan view taken along lines 10—10 of FIG. 7.

FIG. 11 is an enlarged schematic diagram of a section of the 4 way solenoid valve, illustrated in FIG. 7.

FIG. 12 is a diagrammatical representation of an electrical control circuit for controlling the 4 way solenoid valve, illustrated in FIG. 11.

The apparatus herein disclosed may utilize fluid in the form of gas or liquid and for the purpose of illustration, the present invention will hereinafter be described as being operated by a liquid, such as oil.

Figure 1:
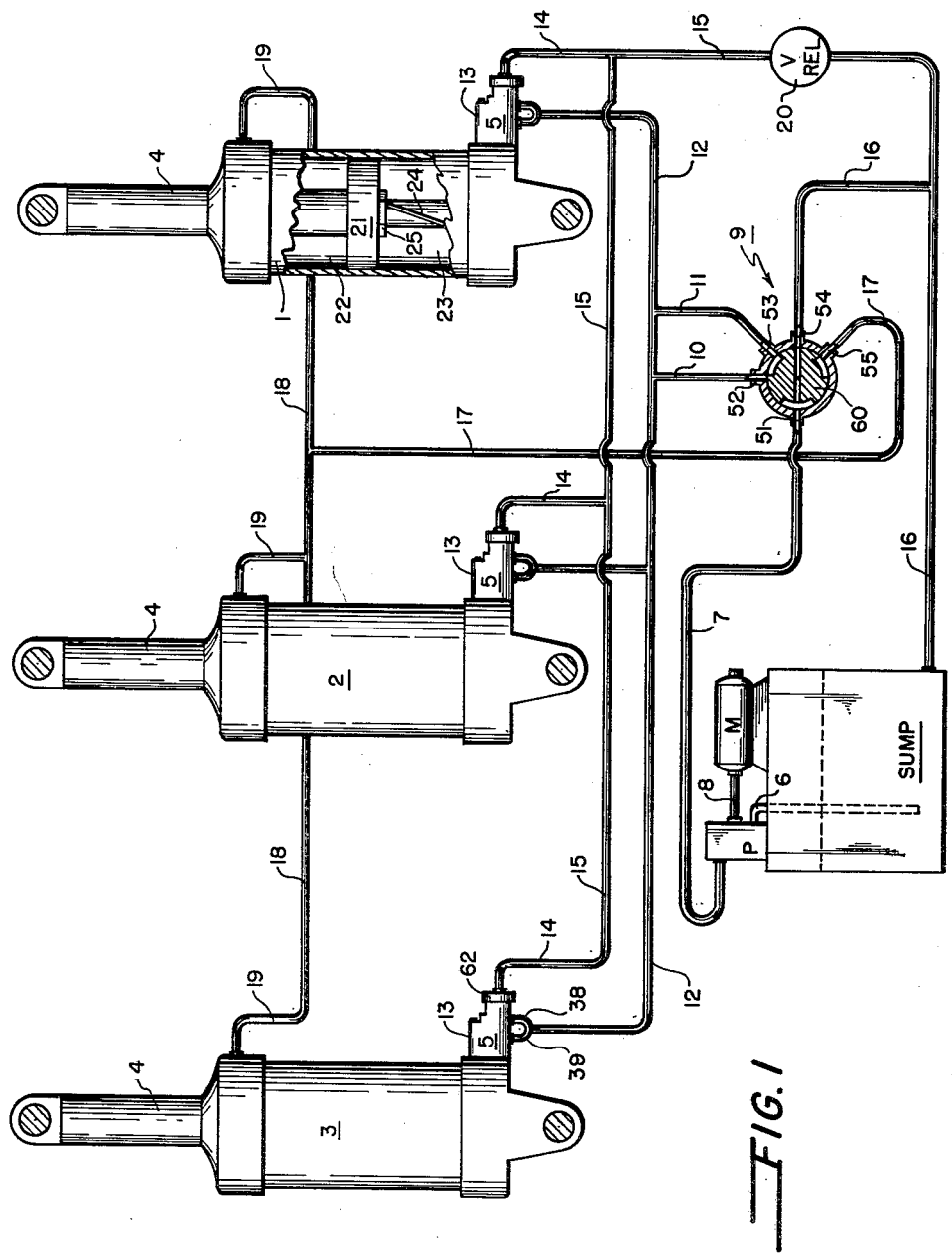
FIG. 1 is a side elevational view of my novel control apparatus for a plurality of fluid operated cylinders.

In FIG. 1 of the drawings, I have shown three fluid operated motors designated by numerals 1, 2 and 3. These cylinders are disposed in upright position, each containing a piston rod, designated by numeral 4.

The hydraulic circuit is illustrated in FIG. 1 as pump P connected to motor M by shaft 8. This pumps the hydraulic fluid through line 6, via line 7 to valve 9 to the various cylinders. In this figure, valve 9 is shown in neutral position thus pumping the fluid back via line 16 to the sump. However, connected to valve 9 is line 17, which in turn connects with line 18, which via line 19 communicates with chamber 22 at the top of the cylinder. Also connected to valve 9 are lines 10 and 11, respectively, which run into line 12 to communicate with synchronizing valve 5 which controls the flow of fluid to and from chamber 23 at the bottom of the cylinder. The synchronizing valve, 5, will be described in greater detail later. Line 15 contains hydraulic fluid and leads via line 14 into the synchronizing valve 5 of each of the cylinders in the system. It will be noted that line 15 leads via relief valve 20 to line 16 and on to the sump. This valve is set to open when the highest pressure normally expected in this circuit is exceeded. The pressure in this line is responsive to the position of the valve stem of valve 5. Line 15 is in effect a sealed circuit which communicates with the valve stem of each of the synchronizing valves. A portion of the casing of cylinder 1 has been broken away to illustrate the piston rod, plunger 21, and a spiral member 24 fitting into piston rod 4 as well as lock nut 25. Thus as the plunger 21 is raised or lowered, the spiral member 24 turns via lock nut 25. The spiralling of the spiral member 24 exerts pressure on a tensioning means, biased against the valve stem of valve 5. The hydraulic fluid in line 15 exerts its pressure, via line 14 to the other end of the valve stem of valve 5. Thus, if one of the series of cylinders gets out of synchronism with the others, the variation in revolution of the spiral member 24 will exert pressure onto the valve stem of valve 5, which in turn either opens or throttles the flow of hydraulic fluid to the particular cylinder. It will be understood, of course, that the valve stem of valve 5 is normally in neutral position, i.e. half closing the valve ports. Now, as the tension is increased due to transmission of energy of the spiraled member to the spring, or other tensioning member, a corresponding hydraulic pressure in lines 14 and 15 exerts itself against the other end of the valve stem. Thus, if all the piston elements are in synchronism, the pressure on either end of the valve stem is equal and the valve stem remains in its normal position. However, if one of the piston elements gets out of synchronism, the resulting inbalance in pressure in its valve will cause a shift of the valve stem and a change in pressure in the hydraulic circuit comprising lines 14 and 15. The change in pressure is transferred via line 14 to line 15 to other synchronizing valves, thus, acting to adjust the flow of fluid to the respective cylinders, and bring the entire system into equilibrium.

Figure 4:
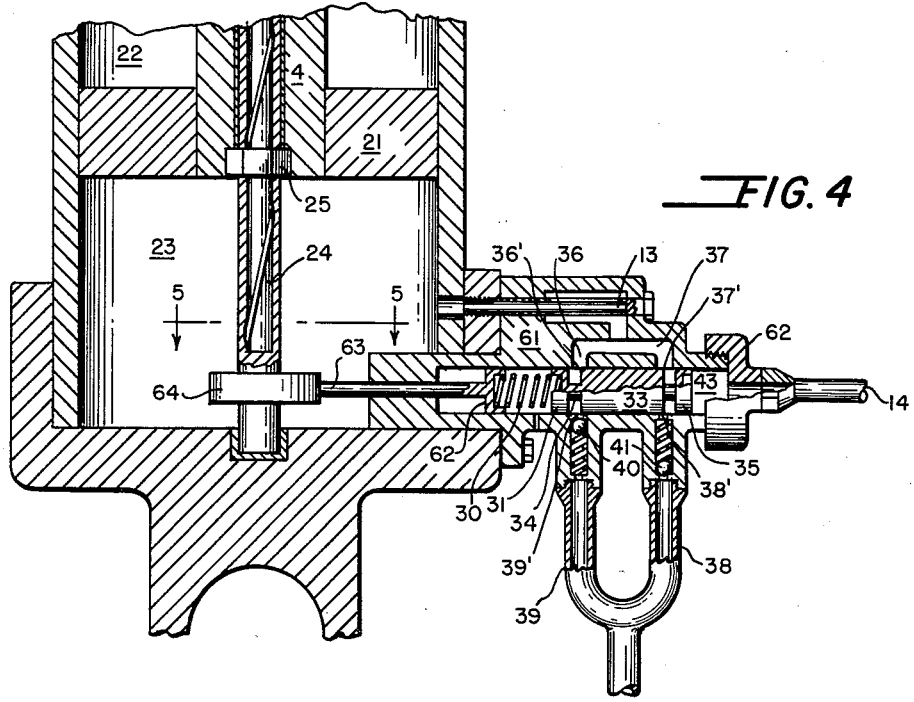
FIG. 4 is a fragmentary sectional view of the improved synchronizing valve of this invention in combination with the lower portion of one of the cylinders.

The construction of this valve will be better understood by reference to FIG. 4.

As will be seen, this valve consists of valve body 61, on which is threadably attached valve cap 62. It contains valve stem 34, which comprises plunger 35, cup 31, and closure member 33. Opening into valve cap 62 is hydraulic equalizing line 14 which empties into chamber 43. Hydraulic fluid from lines 14 and 15 exerts its pressure on plunger 35 while cup 31 of the valve stem is tensioned against spring 30. Thus, a variation in the tensioning of spring 30 is immediately reflected in the pressure of the equalizing line 15. However, since the construction of each of the valves in the series is identical, the pressure reflected in the equalizing line exerts itself on the plunger 35 of the valve stem of each valve so that if all the pistons are in unison, closure member 33 does not move either to the right or to the left. In other words, the pressure exerted by the spring at one end of the valve stem is exactly equal to the pressure exerted against the plunger of the valve stem by the hydraulic fluid at the other end. It will be noted that hydraulic line 12 splits into branches 38 and 39 each containing a one way ball and spring check valve indicated by numerals 41 and 40 respectively. Flow of hydraulic fluid from the cylinder is via branch 36 of line 13 and 39 of line 12 past check valve 40. Flow of hydraulic fluid from line 12 to the cylinder is via branch 38, check valve 41, branch 37 of line 13, and from there into chamber 23 of the cylinder. The rate of flow of hydraulic fluid through the valve is governed by the position of the closure member of the valve stem in relation to port 36' and 39' or 37' and 38'. Upon movement of the valve stem to the right, valve closure member 33 tends to close ports 38' and 37' to cut off the flow of fluid into the cylinder or open ports 36' and 39' for flow of fluid out of the cylinder. This moves plunger 35 to the right to compress the fluid within chamber 43 which is relayed via line 14 to hydraulic equalizing line 15. As previously indicated, the increased pressure in line 15 is relayed to corresponding chambers in corresponding valves of the system to push the valve stem in said valves to the left, thus tending to close off ports 36' and 39'. Thus, the flow of hydraulic fluid out of chamber 23 is throttled in the other cylinders until the whole system is again in equilibrium.

The pressure against the valve stem is on one side by means of spring 30 tensioned against cup 31 and on the other by the pressure of hydraulic fluid in the equalizing line against plunger 35. The pressure against the spring is relayed by means of cup 62, of piston rod 63, which in turn engages with the cam surface of volute cam 64. This cam is installed so that when plunger 21 of the cylinder is at the top of its stroke, piston rod 63, will be engaged against cam surface 64b.

The spiralled member, 24, due to engagement with lock nut, 25, revolves to turn cam, 64, in a counterclockwise manner. Accordingly, as the plunger, 21, of piston rod, 4, descends, the end of piston rod, 63, follows the cam surface, until it reaches 64a, which occurs as the plunger, 21, hits the end of its downward stroke. This tends to relieve the tension of spring 30, and the pressure in equalizing line, 15. As already indicated, movement of the valve stem in either direction is immediately reflected in the pressure exerted by the hydraulic fluid of the equalizing line on the valve stems of the other valves in the system. Thus, as long as all of the cylinders in the system are operating synchronously, the hydraulic pressure on the plunger of the valve stem is the same for each. However, if one cylinder is out of synchronism, the hydraulic pressure will be either greater or less than the pressure exerted by the spring. Thus, the valve stem of that cylinder will move to the right or left to open or throttle the flow of hydraulic fluid to the cylinder. The effect on the revolution of the spiralled member, caused by the change in the rate of speed of the piston rod, will be reflected in the tensioning spring through the position of piston rod, 63, in relation to the cam, until the tension of the spring is equal to the hydraulic pressure in chamber 43. It will be appreciated that any variation in the positioning of the valve stem in any of the valves will immediately effect a change in the rate of flow of hydraulic fluid to its cylinder, with concomitant changes in the rate of revolution of the spiralled member. This is translated as tension in biasing spring against the valve stem as well as a result, a change in the hydraulic pressure in the equalizing line.

Figure 6:
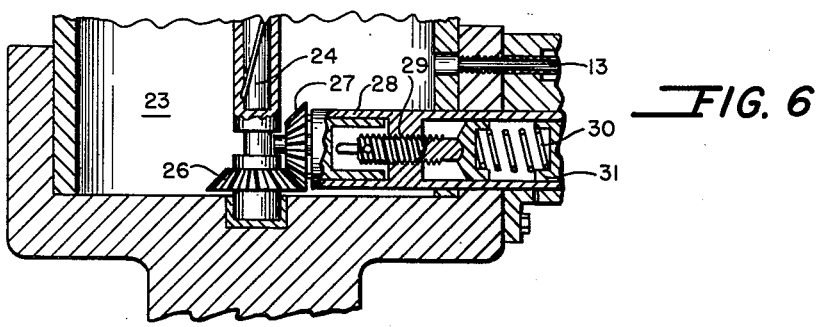
FIG. 6 is a fragmentary sectional view of the lower portion of one of the cylinders illustrating the gear transmission in combination with the tensioning spring of the synchronizing valve.
Figure 5:
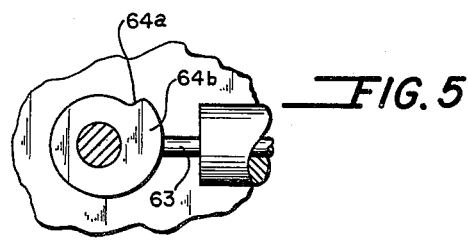
FIG. 5 is a fragmentary plan view taken along lines 5—5 of FIG. 4.

In FIG. 6, a pair of helical gears, 26 and 27, and a housing, 28, which engages with a threaded member, 29, have been substituted for cam and piston rod, 64 and 63. In this modification, the revolution of the spiralled member is transferred via said gears and the threaded member of the spring, 30, biasing against cup 31 of the valve stem as previously described.

It will be appreciated that valve 5 controls the stroke of cylinder piston 4 during both its upward and downward strokes. During its upward stroke, the flow of hydraulic fluid from line 12 to chamber 23 is controlled by the position of valve stem 34 to ports 37' and 38'. During the downward stroke the flow of hydraulic fluid from chamber 23 to line 10 is via ports 36' and 39' of valve 5 and that rate is determined by the position of valve stem 34 to said ports.

Valve 9 is best illustrated in FIGS. 2 and 3. This valve consists of valve housing 50, and the valve core, 60. The valve housing contains valve ports, 51, 52, 53, 54 and 55. Valve core, 60, contains ducts, 56, 57 and 58. The positioning of the duct for the operation of lowering the piston rod, 4, of the cylinder is illustrated in FIG. 2. Hydraulic fluid from the sump is pumped via line 6 through the pump by line 7 to port 51 of valve 9. Duct, 56, connects ports 51 and 55 thus joining line 7 and line 17. Line 17 connects with line 18 which leads via line 19 to chamber, 22, at the top of the cylinder. Hydraulic fluid in chamber, 22, exerts its pressure on plunger, 21, to push the piston rod, 4, downwardly. Simultaneously, hydraulic fluid from chamber, 23, is forced via line 13 through branch 39 of valve 5 to line 12. Line 12 is connected via line 10 to valve port 52, which connects to valve port 54 via duct 57. Thus, the fluid flows via line 16 to the sump.

FIG. 3 illustrates the position of valve 9 during the operation of raising piston rod 4 of the cylinder. Again the hydraulic fluid is pumped via line 7 to port 51 of valve 9, where it flows via duct 56 through port 53 to line 11. Line 11 connects to line 12 so that the hydraulic fluid may flow via branch 38 through valve 5 to chamber 23 of the cylinder by way of line 13. This forces plunger 21 of piston rod 4 upward. Simultaneously, hydraulic fluid from chamber 22 of the top of the cylinder is evacuated via line 19. From here it flows via line 18 and line 17 to port 55 of valve 9. Port 55 is connected to port 54 via duct 58. Hydraulic fluid flows via line 16 to the sump.

Operation

FIG. 7 illustrates the operation of three cylinders in which the piston and plunger of cylinders 2 and 3 are lagging behind cylinder 1. FIGS. 8, 9 and 10 illustrate the position of cam 64 in relation to the position of plunger 21 in each of the cylinders. As will be noted the operation is that of raising the pistons and to that end hydraulic fluid is pumped from the sump via lines 6 and 7 through 4-way solenoid valve 99 to line 12. From line 12 the hydraulic fluid flows via ports 37′ and 38′ through valve 5 and to chamber 23 via line 13. As plunger 21 is raised by the hydraulic fluid spiralled member 24 engaging with lock nut 25 turns volute cam 64. Piston rod 63 engaging with the cam surface of cam 64 transfers this energy to spring 30 which is engaged against cup 31 of valve stem 34. As plunger 21 of cylinder 1 gets out of synchronism with plunger 21 of cylinders 2 and 3, the position of volute cam 64 and piston rod 63 increases the tension on spring 30 of cylinder 1 over that of spring 30 of cylinders 2 and 3. The valve stem 34 of cylinder 1 is pushed to the right, thus throttling the flow of hydraulic fluid via ports 37′ and 38′ of valve 5 to chamber 23 of cylinder 1. As the plunger 35 of valve stem 34 of cylinder 1 is pushed to the right, the pressure in chamber 43 of the valve is increased. This increase in pressure is relayed via lines 14 and 15 to chamber 43 of the valve of cylinders 2 and 3. This pushes the valve stem to the left thus tending to open ports 37′ and 38′ of valve 5 and this increases the rate of flow to chamber 23 of cylinders 2 and 3. Thus, the rate of flow to hydraulic fluid is throttled to cylinder 1 and increased to cylinders 2 and 3 until the system comes to equilibrium. Flow of hydraulic fluid from the upper chamber 22 of the cylinders is generally indicated via line 17 through valve 99 to line 16 to sump.

It will be noted that full oil pressure is exerted and utilized at all times for controlling movement of the piston rod. Hence, the arrangement may be termed a constant pressure variable volume system, as distinguished from systems wherein the pressure is varied for controlling operation of a pump or other parts of the system.

The 4 way solenoid valve 99, depicted in FIG. 7 and illustrated in detail in FIG. 11 is a reversing valve containing four normally closed solenoid valves SV-1, SV-2, SV-3 and SV-4. The valve contains ducts 97 and 98 which connect lines 7 and 12 and lines 16 and 17 respectively. During the upstroke, valves SV-1 and SV-2 are open, allowing fluid to be pumped to the lower portion of the cylinders via line 12 and to be returned from the upper portion of the cylinders via line 17 and via line 16 to the sump. These valves are energized upon the contact of plunger 21 of the piston element with limit switch LS-2 (see FIG. 7) and are held open until the plunger 21 makes contact with limit switch LS-1 at the top of the cylinder by means of relay R-2.

Referring now to FIG. 12, the electrical control circuit consists of: limit switches LS-1 and LS-2, momentary contact switches S-1 and S-2, two double throw, triple pole relays R-1 and R-2 and four normally closed solenoid valves SV-1, SV-2, SV-3 and SV-4 and an A.C. source 70.

Normally, plunger element 21 would close limit switch LS-2 at the end of the downstroke, however, the operation may be started by closing momentary contact switch S-2. Closing either of these switches energizes relay coil 81 by completing the circuit through lines 80—82—71 and 72 to the source 70. Contacts 100′ and 102′ are closed to complete a circuit through 77, contacts 108 and 109 of R-1 and line 83 to line 80. This interlocks R-2. Closing of contacts 104′ and 105′ activates solenoid valve SV-1 and SV-2, providing the proper fluid flow for the upstroke. R-2 is de-energized because the circuit through the coil 87 via lines 79 and contacts 108′ and 109′ of R-2 has been broken. Consequently, the normally closed solenoid valves SV-3 and SV-4 are not energized and remain closed.

As the piston element 4 reaches the end of the upstroke LS-1 is closed energizing coil 87 of relay R-1. Coil 81 of R-2 is simultaneously de-energized, since contacts 108 and 109 separate to break the circuit. Coil 87 of R-1 is interlocked by the closing of contacts 100 and 102 of R-1 and 108′ and 109′ of R-2. Normally closed solenoid valves SV-3 and SV-4 are energized and opened by the closing of contacts 104 and 105. Simultaneously, normally closed solenoid valves SV-1 and SV-2 are de-energized and closed by the separation of contacts 104′ and 105′ of R-2. The fluid flow in valve 99 is now proper for the downstroke. It will be apparent to those skilled in the art that many modifications may be made in the construction and arrangement of this invention without departing from the spirit or scope thereof. I do not therefore wish to be understood as limiting the invention to the precise embodiment herein disclosed, except as to be commensurate in scope with the appended claims.

I claim:

1. In a fluid driven power device comprising at least two double acting cylinders, connected for operation in synchronism, a first fluid circuit comprising pressure and return lines, associated with a source of fluid supply and a reversing valve arranged for connection to said pressure and return lines, the combination in which each of said cylinders contains a piston element, adapted for vertical movement therein, a rotatable shaft connected therewith and rotatable incident to the movement of said piston element, a synchronizing valve associated with said cylinder for regulating the flow of pressure fluid thereto and consisting of a valve casing, a cylindrical valve stem, slidably positioned therein and valve ports connected to said pressure and return lines and communicating with said cylinder, a tensioning member and motion translating means connected between said rotatable shaft and said tensioning member, said tensioning member abutting against one end of said valve stem, whereby said valve stem is urged horizontally relative to vertical movement of said piston element, said valve stem abutting at its other end against a second fluid circuit, consisting of fluid pressure lines which communicate with the end of the valve stem of each synchronizing valve of each cylinder in the system, whereby said valve stem responds to an inbalance of pressure between the tensioning member and said second fluid circuit, so as to regulate the flow of fluid between its associated cylinder and said first fluid circuit, and to transmit to said second fluid circuit and thereby to each of the other synchronizing valves in the system, any change in pressure effected thereby whereby the flow of fluid to each associated cylinder is regulated to maintain the piston elements of all cylinders in synchronism.

2. A power apparatus as defined in claim 1 in which the tensioning member is a spring.

3. A power apparatus as defined in claim 1 in which the tensioning member is a bellows.

4. A power apparatus as defined in claim 1 in which the motion translating means is a gear transmission.

5. A power apparatus as defined in claim 1 in which the pitch of the rotary member is such that its revolution during the full length of the piston stroke is less than 360° and in which the energy of said revolution is transmitted to the tensioning member by means of a member engaging with the cam surface of a volute cam driven by said rotary member.

6. A power apparatus as defined in claim 1 in which the tensioning member is a telescopic chamber containing a compressible fluid.

7. In a fluid driven power device, comprising a plurality of double acting cylinders, connected for operation in synchronism, a first fluid circuit comprising pressure and return lines, associated with a source of fluid supply and a four way reversing valve, arranged for connection to said pressure and return lines; the combination in which each of said cylinders contains a piston element adapted for vertical movement therein, a rotatable shaft connected therewith, and rotatable incident to the vertical movement of said piston element, a synchronizing valve associated with said cylinder for regulating the flow of pressure fluid thereto and consisting of a valve casing, a cylindrical valve stem, slidably positioned therein, and a valve port connected to said pressure and return lines and communicating with said cylinder, check valves in said valve ports to prevent passage of fluid in only one direciton therethrough, a tensioning member and motion translating means connected between said rotatable shaft and said tensioning member, said tensioning member abutting against one end of said valve stem, whereby said valve stem is urged horizontally relative to vertical movement of said piston element, said valve stem abutting at its other end against a second fluid circuit, consisting of fluid pressure lines which communicate with the end of the valve stem of each synchronizing valve of each cylinder in the system, whereby said valve stem responds to an inbalance of pressure between the tensioning member and said second fluid circuit, so as to regulate the flow of fluid between its associated cylinder and said first fluid circuit and to transmit to second fluid circuit and thereby to each of the other synchronizing valves in the system, any change in pressure effected thereby, whereby the flow of fluid to each associated cylinder is regulated to maintain the piston elements of all the cylinders in synchronism.

8. A fluid driven power apparatus as defined in claim 7 in which the reversing valve is solenoid actuated.

References Cited in the file of this patent

UNITED STATES PATENTS

| | | |
|---|---|---|
| 2,378,497 | Phillips | June 19, 1945 |
| 2,487,402 | Watson | Nov. 8, 1949 |
| 2,532,342 | Sloane | Dec. 5, 1950 |
| 2,759,330 | Van Broekhoven | Aug. 21, 1956 |
| 2,785,535 | Alcorn | Mar. 19, 1957 |
| 2,938,351 | Brooks | May 31, 1960 |